United States Patent Office 2,752,247
Patented June 26, 1956

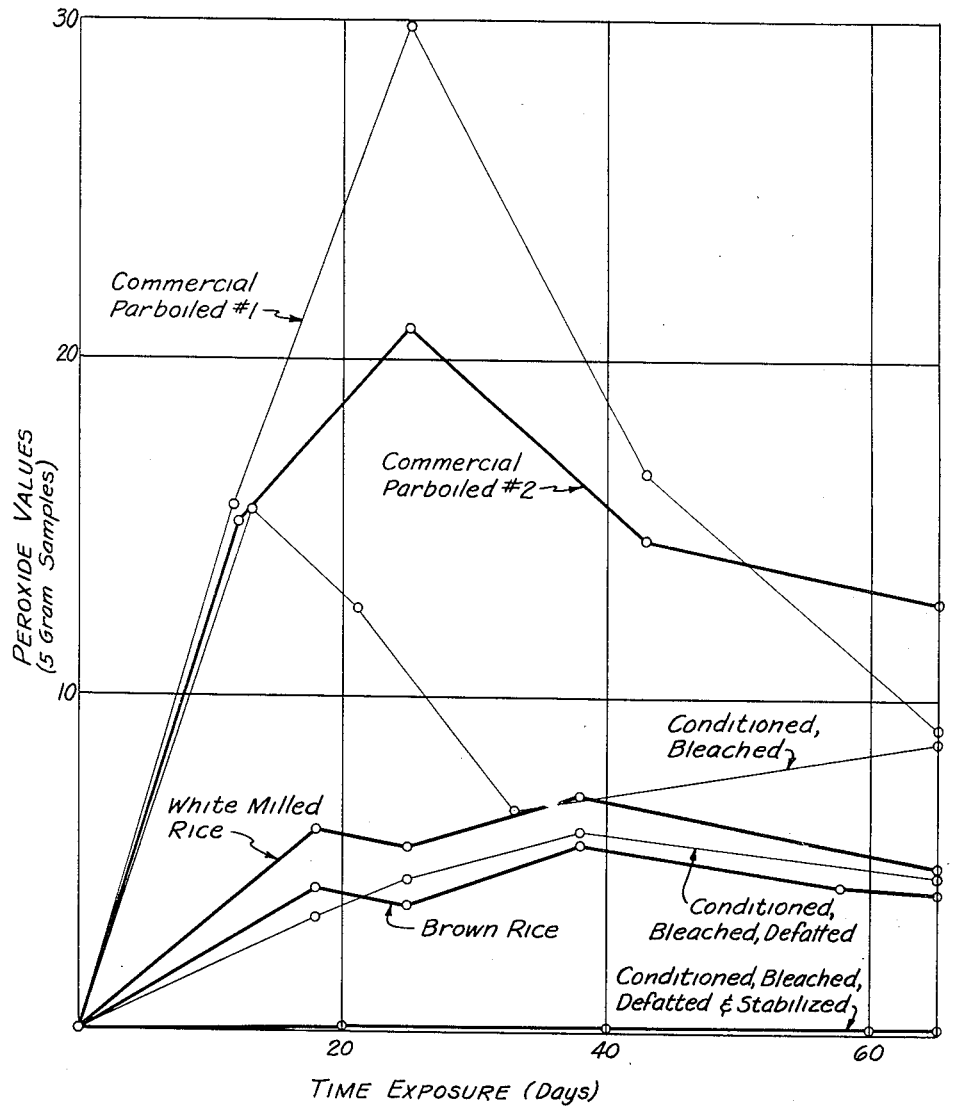

2,752,247
RICE PROCESSING

Ray C. Chandler, Palo Alto, Calif.

Application February 4, 1952, Serial No. 269,814

15 Claims. (Cl. 99—80)

This invention relates to improvements in the processing of rice by the method commonly known as parboiling, i. e., the rice paddy is steeped, gelatinized and dried before milling. My improvements preserve more fully the naturally occurring vitamins, including thiamine, greatly shorten and simplify the steeping period and yield a product more acceptable in color and having greater resistance to rancidification.

One object of my invention is to reduce the time of steeping so that processing operations may be expedited; by reducing the steeping time, the period of exposure to high temperature is shortened and thiamine and other heat sensitive vitamins are not destroyed even in a neutral solution. Another object is the prevention of amber discoloration commonly due to excessive heat exposure. Another object is the preparation of the starch and fatty materials for the extraction of the fatty materials. Another object is to reduce the cost of operation by eliminating the need of special metals, procedures and controls. Another object is the improvement in milling yield through drying rice slowly at about or below room temperature.

Rice is used in the whole grain form called "head rice" almost universally for human consumption. As harvested, the hulls adhere to the grain and in this form, known as paddy rice, it is stored until milled. To preserve paddy rice against spoilage, the moisture content in rice in storage is held at about 14% or less (moisture content herein is based on the dry weight of the material when dried to constant weight at 85° C.). When the hulls are removed, the raw unmilled rice is known as brown rice. The major portion of the vitamins, fats, minerals and natural coloring materials are concentrated near the surface of the grain. The inner portion, known as the endosperm, is largely starch. The fatty materials have a tendency to become rancid and unpalatable. The color and flavor of brown rice is generally unacceptable in spite of its rich nutritional values. To meet the demands of human preference, rice is most generally milled so that a major part of the fatty and colored materials are removed to yield a white rice product with less tendency to become rancid; this product is called "white milled rice." The milling process removes approximately 80% of the vitamins and minerals and considerable protein, resulting in nutritional losses which contribute to serious nutritional diseases. Also, approximately 15% to 20% of the grains break in milling and are no longer head rice.

The type of rice processing called parboiling consists of soaking or steeping the rice, preferably as paddy rice, gelatinizing the starch, then drying and milling. By this method it is possible to force the water soluble constituents to move inwardly and to harden the grain so that less breakage and a smaller fraction of the vitmins is lost in the milling operation. The common disadvantages of the parboiling process are:

(1) The content of heat sensitive vitamins like thiamine may be reduced or destroyed, (2) Undesirable color may be induced, (3) The tendency toward rancidity is greatly enhanced, and (4) The process is time consuming.

According to the procedures of my invention the process is carried out with such regard for the physical and chemical properties of starch, fats and vitamins as to promote the nutritional values and consumer appeal at minimum expenditure of time and labor.

Among the nutritional constituents of raw rice, thiamine is outstanding. Present day knowledge shows that a deficiency of thiamine leads to polyneuritis and beri-beri. Each gram of starchy cereal requires approximately two micrograms of thiamine for human utilization. Native raw rice contains about twice the required amount of thiamine, but milled white rice contains only about one-third of the requirement. Thiamine is readily destroyed by exposure to heat and alkalinity of the processing solution. Under unfavorable temperature exposure excessive loss of thiamine occurs.

When paddy rice is taken from storage at about 14% moisture content and steeped in preparation for gelatinization, the rate of water absorption and distribution is extremely slow at moderate temperatures. The rate of absorption increases markedly with increase of temperature but a rise of temperature sufficient to shorten the steeping period to a practicable period destroys a significant part of the thiamine unless the processing solution is acidic. High temperature also develops an artificial amber color which cannot be readily removed. A hot acidic processing solution requires special precautions respecting metal equipment and controls.

I have discovered that the time required for steeping rice in preparation for gelatinization at any given temperature is greatly shortened when the initial moisture content of the paddy rice is about 25% or more instead of the customary approximately 14% moisture content of stored paddy. By the simple expedient of raising the moisture content to this higher range somewhat in advance of the steeping period the grain is so conditioned for rapid absorption of the water required for gelatinization that the period of heat exposure is correspondingly reduced, thiamine is preserved and the artificial amber color does not develop. Furthermore, an important practical result is the fact that the processing can be carried out in neutral solution, i. e., it is not necessary to use an acidic solution to protect the thiamine. The conditioning procedure itself requires only a matter of minutes. The distribution of moisture occurs in storage, moving the solubles inwardly only. The steeping of all or any part of the lot can be introduced at any time during several days, thereby giving great freedom to commercial operations.

Due to the moderate temperature exposure made possible by my conditioning process, the fatty materials are readily extracted from the outer areas of the grain so that the tendency for rancidification is very markedly reduced. Furthermore, by incorporating a very small amount of a complete antioxidant, i. e., an antioxidant containing both phenolic and acidic components, into the extracting solvent, the residual fatty materials may be stabilized further against oxidation and made superior to either brown or white milled rice. Thus, bleaching, defatting and stabilization of the product may be made to occur simultaneously as a result of the conditioning treatment. For certain markets it is desirable to retain the oil. This may be accomplished by removing the color with an organic solvent containing from 6% to 10% rice oil, preferably, or other vegetable oils such as cottonseed oil, peanut oil, soy-bean oil, etc. As a further consequence of my conditioning step, neither an acidic solution nor a closed system, as for vacuum or pressure, is needed in the steeping and gelatinization steps.

The conditioning procedure provides a basic step for the preparation of a series of rice products, each of which is rich in vitamins including thiamine but which vary in character according to subsequent treatment to satisfy market requirements as follows:

1. A whole grained rice product conditioned, steeped, gelatinized, dried, de-hulled and milled. This product is rich in thiamine, contains a large part of the naturally occurring colored and fatty materials, but is subject to rancidity to an extent similar to other processed rice.

2. A whole grained product conditioned, steeped, gelatinized, dried, de-hulled, milled and treated with an oil rich solvent that extracts the colored materials. This thiamine-rich product is bleached white in color and has a reduced tendency toward rancidification because of its lighter color.

3. A whole grained rice product treated as in (2) in which the oil-rich solvent contains a complete antioxidant. This thiamine-rich product is bleached white, contains its normal oil content and has an improved stability with respect to rancidification.

4. A whole grained rice product conditioned, steeped, gelatinized, dried, de-hulled, milled and extracted with an organic solvent. This product is rich in thiamine, bleached white in color, and its surface is defatted so that its stability with respect to rancidification is approximately equal to brown rice.

5. A whole grained product conditioned, steeped, gelatinized, dried, de-hulled, milled and treated with a fat solvent containing a complete antioxidant. This thiamine rich product is white in color, free of surface fatty material, while the residual fatty material is more stable with respect to oxidation than white milled rice. Furthermore, aforestated whole grain products resulting from the procedures of this invention provide a source for ground cereal products of the same general composition and characteristics.

Having outlined the nature of the invention I will now describe the preferred procedure in further detail.

RICE CONDITIONING

The conditioning of rice entails the addition of water sufficient to raise its moisture content to a range above about 25% and as high as about 40%. An intermediate moisture content of, say 30% to 35%, is a very practical one. The moisture is permitted to distribute itself throughout the rice in bulk storage and is ready for steeping after about twelve hours following the initial wetting. The moistened rice may be held from three to seven days, depending on moisture and temperature conditions; the holding period may be extended either by acidifying the conditioning moisture or by hot water for either treatment retards the fermentative processes in the rice. The essential acidity should not be less than about pH 2 and is best attained by use of an appropriate amount of any strong acid such as sulphuric acid, nitric acid or hydrochloric acid requiring, respectively, about 0.6, 0.95 and 1.1 pounds concentrated acid per 1000 pounds of water. Within a short time following the initial wetting and after draining, the surface of the grain is dry to the touch and the rice may be conveyed from the storage bin to the steeping equipment just as stored grain is usually handled. This permits wide latitude in processing operations. Any suitable method for applying moisture may be used for the initial wetting. A practical method is the immersion of the paddy in tap water at ordinary temperatures for 15 to 20 minutes, draining and storing in bulk. If hot water at 60° C. to 80° C. is used, only about five minutes' contact is required. The paddy should then be drained, cooled as by a fan, and stored. The operation may be either batch or continuous. A practical holding period for conditioning is 48 hours following the initial wetting.

STEEPING CONDITIONED RICE

Conditioned rice may be conveyed or otherwise transported like stored grain from the bin to the steeping tank where it is immersed in an excess of water and the slurry held at some predetermined temperature preferably not in excess of about 60° C. until a moisture content of approximately 50% has been absorbed and adequately distributed throughout the grain in preparation for complete gelatinization. Inadequate moisture distribution is responsible for whitish un-gelatinized areas in the processed grain.

The following table presents data on two portions of the same lot of short grain rice paddy in which the steeping of one portion began at the moisture content in storage of 11.2%, while the second portion of the same lot had been conditioned to a moisture content of 33.6% before steeping began. These data illustrate the beneficial effects of conditioning with respect to the temperature exposure required in the preparation for gelatinization.

Table I.—*Relation of initial moisture content to steeping time at 3 temperatures for calora paddy rice*

| Initial Moisture Content | Steeping Temperature, ° C. | Percent Moisture Content after Steeping | | | | | | | | | |
|---|---|---|---|---|---|---|---|---|---|---|---|
| | | 1 hr. | 2 hrs. | 3 hrs. | 4 hrs. | 6 hrs. | 8 hrs. | 10 hrs. | 12 hrs. | 24 hrs. | 36 hrs. |
| 11.2 | 40 | | 24 | | 38 | | 41 | | 44 | 46 | 47 |
| 33.6 | 40 | | 46 | | 49 | | 49 | | 51 | 51 | 50 |
| 11.2 | 50 | | 36 | | 39 | 43 | 46 | 46 | | | |
| 33.6 | 50 | | 45 | | 48 | 50 | 49 | 48 | | | |
| 11.2 | 60 | 34 | 40 | 45 | | 49 | | | | | |
| 33.6 | 60 | 46 | 50 | 50 | | 50 | | | | | |

From the foregoing data on short grain rice paddy which is very resistant to penetration by water, it is evident that the steeping time has been greatly reduced due to conditioning. From this and other data I have found that the stepping time for conditioned rice paddy is about 8 to 12 hours at 40° C., 5 to 7 hours at 50° C., and 2½ to 4 hours at 60° C., depending on the type and variety of rice. Because of the relatively short period of exposure to an elevated temperature, the processing solution may be neutral thereby obviating the need of pH control and acid resistant equipment.

GELATINIZATION

Gelatinization of conditioned and steeped rice paddy having a moisture content of approximately 50% may be accomplished by any procedure allowing a temperature in excess of about 65° C. to be imposed for an appropriate period. For the purposes of this invention, the time exposure to a gelatinization temperature must be below the temperature-time exposure that will materially affect the thiamine content or the color of the product. Practical time-temperature exposures are as follows: 20 minutes at 70° C., 5 minutes at 80° C., 2 minutes at 90° C., 1 minute at 100° C. Water is an excellent heating medium up to 100° C. Steam, dielectric heating or any suitable method for heat transfer that permits controlled flash heating is satisfactory. Upon completion of gelatinization, the rice is cooled to or near room temperature to stop any further heat effect.

DRYING CONDITIONED STEEPED GELATINIZED RICE

The freshly gelatinized rice may be conveyed directly to a conventional rice drier and dried therein to the appropriate moisture content for milling which is near 14%–16%. When conditioning, steeping and gelatinization have been carried out with the precautions outlined above to preserve the thiamine content and color, the yield of head rice is also improved by keeping the drying temperature below 35° C. and drying at a rate that removes the moisture until the rice is in condition for milling within not less than 10 to 12 hours. The bonding between starch molecules is improved by low temperature drying such as is induced by the evaporation of the moisture by air at room temperature or other methods of temperature control.

After drying, the processed paddy may be stored almost indefinitely until it is desired to de-hull and mill. The hulls protect the grain from the catalytic effects of light upon the fatty materials. Upon removal of the hulls, oxidation begins upon exposure to light.

DE-HULLING AND MILLING

Conditioned, steeped and gelatinized, dried paddy may be de-hulled by conventional rice milling equipment. Operations with conventional and well-known de-huller and milling equipment on unprocessed rice show that the same settings and time are suitable for de-hulling and milling rice paddy processed in accordance with this invention; less bran is removed from the hardened processed rice paddy, however, and the vitamin-rich germ is retained almost completely.

BLEACHING, DEFATTING AND STABILIZING RICE

After milling, the product still retains a large portion of the naturally occurring colored and fatty materials on or near the milled surface. The mild temperature exposures provided for by this process and the controlled drying conditions promote changes in the physical and chemical relationships among starch, fatty materials and colored substances so that, following milling, the colored and fatty materials may be readily removed from the surface. Bleaching is a process which removes the colored materials thus giving the rice a white translucent appearance acceptable to the trade. Bleaching is best effected with a non-aqueous medium since starch avidly absorbs water and the rice becames checked and brittle. Defatting requires a fat solvent which will quickly remove about 40% to 60% of the fatty material from a rice grain that has been processed as outlined hereinbefore. The bleaching may be effected independently by treating the milled rice with a fat solvent containing 6%–10% rice oil preferably, or other vegetable oils such as soy-bean oil, cotton-seed oil or peanut oil, in which case the rice is bleached white but the oil retained. Considerable stability with respect to rancidification of the oil may be imparted to the product merely because the bleached white rice is less susceptible to the effect of light. Both bleaching and defatting may be achieved simultaneously with a fat solvent such as ethyl alcohol, acetone or hexane and the like. Such treatment removes the fat most accessible to the air and stabilizes the product to a quality equal to brown rice. The addition of a complete antioxidant to the solvent such as propyl gallate and citric acid, will further stabilize the residual oil so that the product has less tendency to oxidize than either brown rice or white milled rice. The application of antioxidants in stabilizing rice against oxidation is facilitated by the conditioning process and the consequent mildness of heat exposure which prepares the rice for rapid effective penetration of the solvent and removal of surface fat. By including the antioxidant in the solvent the antioxidant may be any one or combination of compounds which supply the essential phenolic and acidic synergistic components recognized in the field of antioxidants. Examples of antioxidants are hydroquinone; propyl gallate and citric acid; nordihydroguaretic acid and ascorbic acid; guaiac and d-iso-ascorbic acid; butylated hydroxyanisole, propyl gallate and citric acid; ethyl gallate and phosphoric acid; iso-ascorbic palmitate and lauryl gallate.

When antioxidants are to be incorporated into the organic solvent used for bleaching and/or defatting the rice, the solvent must be somewhat polar to dissolve the antioxidant. Acetone, alcohol or ether are examples, acetone being the preferred solvent.

Seven whole grain rice products, produced in accordance with this invention, were tested for thiamine content, color and resistance to oxidation; the seven samples tested for thiamine averaged 4.1 micrograms per gram, which was equal to the thiamine content of the brown rice of the same lot.

Six products of this invention were compared in color with two white milled rice and four commercial parboiled products obtained on the open market. The whiteness of the products, also expressed as the luminous apparent reflectance, was measured by the standard method prescribed by the International Congress on Illumination and recognized by the Bureau of Standards. In the following table the various rice products are compared with the whiteness of magnesium oxide and also with white milled rice as standards, as measured with a No. 610 photovolt reflectance meter using a green tristimulus filter.

*Table II*

| No. of Samples | Description of Sample | Percent Reflectance of Standard | |
|---|---|---|---|
| | | MgO | White Milled Rice |
| 3 | Conditioned, bleached and defatted long grain. | 48.5 | 102 |
| 2 | Conditioned, bleached and defatted short grain. | 43.5 | 95.5 |
| 1 | Conditioned, bleached, not defatted long grain. | 45 | 93 |
| 2 | White milled rice | 47 | 100 |
| 1 | Commercial parboiled No. 1 | 28 | 60 |
| 1 | Commercial parboiled No. 2 | 38 | 83 |
| 1 | Commercial parboiled No. 3 | 39 | 85 |
| 1 | Commercial parboiled No. 4 | 36 | 78 |

Products of the invention were also compared with brown rice, white milled rice and commercial parboiled products with respect to susceptibility to oxidation by measuring the development of peroxides, the recognized prelude to rancidification. The samples were held in layers 4 millimeters thick between glass plates so as to be uniformly exposed to diffuse light from both sides. Peroxide values were determined by the Lea method at intervals yielding results as shown in the graph in the accompanying drawing.

The improvement in resistance of rice to oxidation is shown by the conditioned gelatinized products by the respective curves for conditioned, bleached; conditioned, bleached and defatted; and for conditioned, bleached, defatted and stabilized treatments. Organoleptic tests showed that brown rice, white milled rice and the commercial parboiled samples were rancid after 25 days' exposure. All conditioned defatted samples were free from rancidity. Defatted and stabilized samples showed no signs of oxidation after more than 100 days' exposure.

As a consequence of the conditioning and subsequent procedures a product may be prepared that is rich in thiamine, white in color and resistant to oxidation. In addition, the treatment produces a pleasing contrast in the chalky white germ at the base of the grain embedded in the translucent white endosperm, giving each grain an attractive birds-eye pattern. These properties contribute to its display and marketability in addition to its inherent nutritive values.

The following examples illustrate procedures which produce high yields of head rice in which the thiamine content closely parallels the thiamine content of the parent brown rice and, in any case, is not less than 70% thereof.

EXAMPLE I 100 pounds of short grain rice paddy were immersed in an excess of tap water at room temperature for 15 minutes, drained and transported to a storage bin where the absorbed and adhering moisture became well distributed and thereby conditioned the grain for rapid steeping. After 48 hours' conditioning, the paddy was conveyed to a steeping vat having a temperature control. The conditioned paddy was submersed in water previously heated to about 55° C. and the slurry was held at 50° C. for 7 hours. The water was then drained from the rice and heated until the temperature of the water was 88° C. when it was again added to the steeped rice with gentle stirring and the temperature held at 80° C. for 5 minutes; the gelatinized paddy was then removed from the vat, cooled quickly by a blast of air, placed in a conventional rice drier and dried at room temperature to about 15% moisture content. The processed paddy was then de-hulled and milled in conventional equipment, removing 5% bran. This product had a reflectance of 39% of that of magnesium oxide, a thiamine content equal to the parent paddy rice; in addition, it was processed in a greatly reduced period of time, in a neutral solution and in simple equipment.

EXAMPLE II 100 pounds long grain rice paddy was immersed in an excess of water at 80° C. for 5 minutes, cooled to room temperature and stored in a suitable bin for conditioning. After 7 days, it was transferred to a steeping vat and held at 60° C. for 2½ hours, then transferred to an excess of boiling water where it was held at approximately 100° C. for 1½ minutes, following which the gelatinized paddy was quickly removed, cooled to room temperature and then transferred to a conventional drier and dried at a temperature below 35° C. at a rate such that it reached 15% moisture content after 10 hours. The dried paddy was stored 5 days and then de-hulled and milled in milling equipment. The milled grain was then washed for 5 minutes with a solvent consisting of hexane containing 7% rice oil and the excess solvent removed by evaporation. The product was white in color, having reflectance of 45% compared with the standard magnesium block, a high vitamin content and a fat content approximately equal to the original paddy.

EXAMPLE III 100 pounds of short grain rice paddy was submersed for 15 minutes at room temperature in an acidified bath of approximately pH 2 composed of 10 gallons of water to which 12 cubic centimeters of concentrated sulfuric acid had been added, drained, and stored for conditioning in a bin for 8 days. The conditioned paddy was then conveyed to a steeping vat and held in excess tap water at 60° C. for 4 hours. The steeped paddy was then gelatinized by replacing the steeping water with water near its boiling point so that it was exposed to 90° C. for 3 minutes. The gelatinized paddy was quickly removed, cooled to room temperature and transferred to a conventional rice drier where air at room temperature was forced through the drying rice, reducing the temperature of the rice several degrees below room temperature; the rate of drying was such as to bring it to a 15% moisture content in 15 hours. The dried processed paddy was then de-hulled and milled in conventional equipment, removing some 4% bran. The milled rice was then bleached and defatted with a 10 minute wash with hexane. The excess hexane was removed in a vacuum chamber and recovered in a condenser. The product had a reflectance of 43.5% as compared with the standard magnesium block, the ether extractables had been reduced approximately 40% and the development of peroxides was reduced 80%, somewhat less than that for white milled rice.

EXAMPLE IV 100 pounds short grain paddy rice was immersed in an excess of tap water at room temperature for 15 minutes, separated from the water and stored 16 hours for conditioning. The conditioned rice was then steeped for 4 hours at 60° C. in an iron vat, drained and subjected to a water temperature of 95° C. for two minutes, then quickly removed, cooled and dried with a current of unheated air to a moisture content of 13%. The dried processed paddy was de-hulled and milled lightly in conventional equipment, then washed in an acetone bath containing 0.01% propyl gallate and 0.01% citric acid. The milled grain was kept in contact with the solvent 30 minutes, then separated from the solvent and the adhering solvent removed by evaporation. The product was pearly white in color, having a reflectance of 43% of the standard; the thiamine content equalled that of the parent brown rice and the product was free from rancidification.

EXAMPLE V 100 pounds long grain paddy rice were placed in a container and covered with tap water at room temperature for 10 minutes, then removed and stored in bulk for two days. The conditioned paddy was then steeped in tap water at 40° C. for 8 hours, then separated and then placed in tap water at an elevated temperature such that the slurry was held at 85° C. for 5 minutes. The gelatinized paddy was then removed, cooled and transferred to conventional drying equipment to be dried to milling condition. The processed paddy was then de-hulled and milled as usual. The milled rice was then bleached and defatted by a 5 minute wash with acetone, drained and transferred to a bath of acetone containing 0.01% nordihydroguaiaretic acid and 0.01% ascorbic acid for 30 minutes. The rice was then removed and the solvent evaporated by conventional means. The thiamine content was 90% of the original content, the rice was pearly white, having a reflectance of 48.5% of the magnesium oxide standard, retained but 60% of its ether extractables and yielded no peroxides during long exposure to light.

EXAMPLE VI 100 pounds short grain paddy was immersed in tap water at room temperature for 30 minutes, then removed and stored in a bin for three days. It was then steeped in a vat of tap water at 60° C. for four hours, then transferred to a moving screen that exposed it to live steam at atmospheric pressure for two minutes for gelatinization. It was then dried at 30° C., attaining a moisture content of 15% after 10 hours. The processed paddy was stored for a week, then dehulled and milled lightly. The milled rice was later bleached and defatted by ten minutes wash with hexane. The adhering solvent was evaporated, the grain was lightly polished and packaged for use. The product had a reflectance of 43.5% of the MgO standard, a thiamine content of 3.1 micrograms per gram (80% of the original content), and its resistance to oxidation was equal to that of white milled rice.

I claim:

1. The process for conditioning rice paddy comprising soaking rice paddy having an initial water content of about 14% in water for from about 20 minutes at room temperature to about 5 minutes at 60° to 80° C. to wet the paddy, draining surplus water from the rice paddy and permitting the so wet rice paddy to stand at a normal atmospheric temperature for at least about twelve hours to establish a substantially uniform distribution of moisture through the rice paddy and increase the moisture content to the range between 25% and 40%.

2. The process of conditioning rice in accordance with claim 1 wherein the water used for moistening the rice has a temperature of at least 60° C. and the soaking is carried on for about five minutes.

3. The process of claim 1 wherein the water is acidified to a pH of about 2.

4. The process of treating rice paddy comprising conditioning the rice paddy by soaking rice paddy having an initial water content of about 14% in water for from about 20 minutes at room temperature to about 5 minutes at 60° to 80° C. to wet the paddy, draining surplus water from the paddy, and permitting the so wet paddy to stand at normal atmospheric temperature for at least about 12 hours, thereby adding moisture to increase its moisture content to within the range of 25% to 40% by weight; then steeping the conditioned rice paddy in water to raise its moisture content to at least about 50%, subjecting the steeped rice to an elevated temperature of above about 65° C. for sufficient length of time to gelatinize the rice starch and then drying the rice to a moisture content of the order of 14% to 16%, and dehulling and milling the rice paddy.

5. The process of treating rice paddy comprising conditioning the rice paddy by soaking rice paddy having an initial water content of about 14% in water for from about 20 minutes at room temperature to about 5 minutes at 60° to 80° C. to wet the paddy, draining surplus water from the paddy, and permitting the so wet paddy to stand at normal atmospheric temperature for at least about 12 hours, thereby adding moisture to increase its moisture content to within the range of 25% to 40% by weight; then steeping the conditioned rice paddy in water to raise its moisture content to at least about 50%, subjecting the steeped rice to an elevated temperature of above about 65° C. for sufficient length of time to gelatinize the rice starch, and then drying the rice to a moisture content on the order of 14% to 16%, dehulling and milling the rice paddy, and contacting the milled rice with a fat solvent to simultaneously bleach and defat the rice.

6. The process of treating rice paddy comprising conditioning the rice paddy by soaking rice paddy having an initial water content of about 14% in water for from about 20 minutes at room temperature to about 5 minutes at 60° to 80° C. to wet the paddy, draining surplus water from the paddy, and permitting the so wet paddy to stand at normal atmospheric temperature for at least about 12 hours, thereby adding moisture to increase its moisture content to within the range of 25% to 40% by weight, then steeping the conditioned rice paddy in water to raise its moisture content to at least about 50%, heating the steeped rice at a temperature above about 65° C. for sufficient length of time to gelatinize the rice starch, drying the rice to a moisture content on the order of 14% to 16%, dehulling and milling the rice, and contacting the milled rice with a fat solvent to simultaneously bleach and defat the rice.

7. The process of claim 6 wherein the drying is carried out at a temperature below 35° C. and at a slow rate in which not less than about 10 hours is required to reduce the moisture content of the rice from 50% to about 14% to 16%.

8. The process of claim 6 wherein the drying is carried out at a slow rate in which about 10 hours is required to reduce the moisture content from 50% to about 14% to 16%.

9. The process of treating rice paddy comprising conditioning the rice paddy by soaking rice paddy having an initial water content of about 14% in water for from about 20 minutes at room temperature to about 5 minutes at 60° to 80° C. to wet the paddy, draining surplus water from the paddy, and permitting the so wet paddy to stand at normal atmospheric temperature for at least about 12 hours, thereby adding moisture to increase its moisture content to within the range of 25% to 40% by weight, then steeping the conditioned rice paddy in water to raise its moisture content to at least about 50%, subjecting the steeped rice to an elevated temperature of above about 65° C. for sufficient length of time to gelatinize the rice starch, drying the rice at a slow rate whereby not less than about 10 hours is required to reduce the moisture content of the rice from about 50% to about 14% to 16%, dehulling and milling the rice and contacting the rice with a fat solvent containing an antioxidant whereby the rice is simultaneously bleached, defatted and stabilized against oxidation.

10. The process of treating rice paddy comprising conditioning the rice paddy by soaking rice paddy having an initial water content of about 14% in water for from about 20 minutes at room temperature to about 5 minutes at 60° C. to 80° C. to wet the paddy, draining surplus water from the paddy, and permitting the so wet paddy to stand at normal atmospheric temperature for at least about 12 hours, thereby adding moisture to increase its moisture content to within the range of 25% to 40% by weight, then steeping the conditioned rice paddy in water to raise its moisture content to at least about 50%, heating the steeped rice at a temperature above about 65° C. for sufficient length of time to gelatinize the rice starch, drying the rice to a moisture content of from 14% to 16% at a temperature not above 35° C. and at a rate whereby said drying requires not less than about ten hours, dehulling and milling the rice and contacting the so-treated rice with a fat solvent containing an antioxidant whereby the rice is simultaneously bleached, defatted and stabilized against oxidation.

11. The process of treating rice paddy comprising conditioning the rice paddy by soaking rice paddy having an initial water content of about 14% in water for from about 20 minutes at room temperature to about 5 minutes at 60° to 80° C. to wet the paddy, draining surplus water from the paddy, and permitting the so wet paddy to stand at normal atmospheric temperature for at least about 12 hours, thereby adding moisture to increase its moisture content to within the range of 25% to 40% by weight, then steeping the conditioned rice paddy in water to raise its moisture content to at least about 50%, heating the steeped rice at a temperature above about 65° C. for sufficient length of time to gelatinize the rice starch, drying the rice to a moisture content of from 14% to 16% at a temperature below 35° C., dehulling and milling the rice and contacting the rice with a fat solvent and an antioxidant whereby the rice is bleached, defatted and stabilized against oxidation.

12. The process of treating rice paddy comprising conditioning the rice paddy by soaking rice paddy having an initial water content of about 14% in water for from about 20 minutes at room temperature to about 5 minutes at 60° to 80° C. to wet the paddy, draining surplus water from the paddy, and permitting the so wet paddy to stand at normal atmospheric temperature for at least about 12 hours, thereby adding moisture to increase its moisture content to within the range of 25% to 40% by weight, then steeping the conditioned rice paddy in water to raise its moisture content to at least about 50%, heating the steeped rice at a temperature above about 65° C. for sufficient length of time to gelatinize the rice starch, drying the rice to a moisture content of from 14% to 16%, dehulling and milling the rice and contacting the rice with a fat solvent containing from about 6% to about 10% of rice oil whereby the rice is bleached without substantially changing the fat content of the rice.

13. The process of treating rice paddy comprising conditioning the rice paddy by soaking rice paddy having an initial water content of about 14% in water for from about 20 minutes at room temperature to about 5 minutes at 60° to 80° C. to wet the paddy, draining surplus water from the paddy, and permitting the so wet paddy to stand at normal atmospheric temperature for at least about 12 hours, thereby adding moisture to increase its moisture content to within the range of 25% to 40% by weight, then steeping the conditioned rice paddy in water to raise its moisture content to at least about 50%, subjecting the steeped rice to an elevated temperature of above about 65° C. for sufficient length of time to gelatinize the rice starch, drying the rice at a temperature below 35° C. and a slow rate to a moisture content of about 15%, said drying being effected under conditions whereby not less than about ten hours are required to reduce the moisture content, dehulling and milling the rice, and contacting the rice with a fat solvent containing from 6% to about 10% of rice oil whereby the rice is bleached without substantially changing its fat content.

14. The process of treating rice paddy comprising conditioning the rice paddy by soaking rice paddy having an initial water content of about 14% in water for from about 20 minutes at room temperature to about 5 minutes at 60° to 80° C. to wet the paddy, draining surplus water from the paddy, and permitting the so wet paddy to stand at normal atmospheric temperature for at least about 12 hours, thereby adding moisture to increase its moisture content to within the range of 25% to 40% by weight, then steeping the conditioned rice paddy in water to raise its moisture content to at least about 50%, subjecting the steeped rice to an elevated temperature of above about 65° C. for sufficient length of time to gelatinize the rice starch, drying the rice to a moisture content of about 15%, said drying being effected under conditions whereby not less than about 10 hours are required to reduce the moisture content, dehulling and milling the rice, and contacting the rice with a fat solvent containing from about 6% to about 10% rice oil whereby the rice is bleached without substantially changing its fat content.

15. The process of treating rice paddy comprising conditioning the rice paddy by soaking rice paddy having an initial water content of about 14% in water for from about 20 minutes at room temperature to about 5 minutes at 60° to 80° C. to wet the paddy, draining surplus water from the paddy, and permitting the so wet paddy to stand at normal atmospheric temperature for at least about 12 hours, thereby adding moisture to increase its moisture content to within the range of 25% to 40% by weight, then steeping the conditioned rice paddy in water to raise its moisture content to at least about 50%, subjecting the steeped rice to an elevated temperature of above about 65° C. for sufficient length of time to gelatinize the rice starch, drying the rice to a moisture content of from 14% to 16% at a temperature below about 35° C., dehulling and milling the rice and bleaching the rice by contacting the rice with a fat solvent containing from 6% to 10% rice oil.

References Cited in the file of this patent

UNITED STATES PATENTS

| | | |
|---|---|---|
| 2,498,573 | Ozai-Durrani | Feb. 21, 1950 |
| 2,515,409 | Jones et al. | July 18, 1950 |
| 2,546,456 | Landon et al. | Mar. 27, 1951 |
| 2,592,407 | Fernandes | Apr. 8, 1952 |